(12) United States Patent
Morimoto et al.

(10) Patent No.: US 7,732,524 B2
(45) Date of Patent: *Jun. 8, 2010

(54) ELASTOMER COMPOSITION, METHOD FOR PRODUCING THE SAME, AND ERASER USING THE SAME

(75) Inventors: Kazuki Morimoto, Osaka (JP); Yasuhiro Nishioka, Osaka (JP)

(73) Assignee: Seed Company Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/179,005

(22) Filed: Jul. 24, 2008

(65) Prior Publication Data

US 2009/0124756 A1 May 14, 2009

(30) Foreign Application Priority Data

Nov. 8, 2007 (JP) .............................. 2007-290488

(51) Int. Cl.
*B43L 19/00* (2006.01)
*C08G 61/00* (2006.01)
*C08K 5/092* (2006.01)
*C08K 5/093* (2006.01)
*C08K 13/02* (2006.01)
*C08L 3/00* (2006.01)
*C08L 7/00* (2006.01)

(52) U.S. Cl. .............................. 524/500; 15/424; 524/9; 524/10; 524/80; 524/702; 524/925

(58) Field of Classification Search ................. 524/500, 524/9, 10, 80, 702, 925; 525/50, 54.4, 54.42; 15/424

See application file for complete search history.

(56) References Cited

U.S. PATENT DOCUMENTS 2,419,822 A * 4/1947 Contesso .................... 423/173
5,922,832 A * 7/1999 Randall et al. ............... 528/354
2008/0033077 A1* 2/2008 Hashimoto et al. ............. 524/9

FOREIGN PATENT DOCUMENTS

JP 2004143315 A * 5/2004
JP 2005255722 A * 9/2005
WO WO 2006064846 A * 6/2006

OTHER PUBLICATIONS

Machine Translation of JP 2005-255722 A (2005).*
Machine Translation of JP 2004-143315 A (2004).*

* cited by examiner

*Primary Examiner*—Milton I Cano
*Assistant Examiner*—Darcy D LaClair
(74) *Attorney, Agent, or Firm*—Sughrue Mion, PLLC

(57) ABSTRACT

An elastomer composition is provided which contains a matrix of biomass plastic and crosslinked natural rubber particles dispersed like islands in the matrix. An eraser using the elastomer composition is also provided. The present invention is capable of providing an elastomer composition and eraser using the same, which can be recycled, are friendly to the environment, and corresponds to the recycling society, without relying on fossil resources.

10 Claims, No Drawings

ELASTOMER COMPOSITION, METHOD FOR PRODUCING THE SAME, AND ERASER USING THE SAME

BACKGROUND OF THE INVENTION

1. Field of the Invention

The present invention relates to an elastomer composition, a method for producing the same, and an eraser using the same, and more particularly to an elastomer composition, which can be recycled, is friendly to the environment, and corresponds to the recycling society, without relying on fossil resources, a method for producing the same, and an eraser using the same.

2. Description of the Prior Art

So far, industries and economies have been advanced using fossil resources such as coal and petroleum oil and social systems based on mass production, mass consumption, and mass disposal have been established and many daily necessities have been based on the fossil resources whose depletion is now expected.

The present social systems have created economical affluence and convenience, but, on the other hand, wastes and carbon dioxide exceeding the natural purification capabilities have been discharged and it has resulted in serious environmental issues such as global warming and harmful substance generation.

In order to solve such problems, it is urgently required to reform today's one-way type social systems, in which a large quantity of commodities are produced from limited resources, consumed and disposed, and to shift the social systems to the recycling society, in which discharge of wastes can be suppressed and the limited resources can be advantageously utilized. To establish this recycling society, in our country, "Biomass Nippon Strategy" was decided upon by the Japanese government at a cabinet meeting held in December, 2002 and Japan has now been challenging reconstruction of the industrial competitive strength.

Biomass is sustainable and regenerable organic resources brought forth by natural blessings. Although biomass emits carbon dioxide when burned, carbon dioxide in atmospheric air is absorbed and fixed by photosynthesis at the time of plant growth and therefore biomass has a characteristic that it does not practically increase carbon dioxide. This is called "carbon neutral" and replacement of energy and commodities derived from fossil resources with biomass makes it possible to considerably lessen the carbon dioxide emission and accordingly, the techniques and product developments therefore have been acutely required.

In recent years, with respect to polymer materials as well, a plenty of proposals have been made in consideration of establishment of recycling society.

For instance, Japanese Patent Application Laid-Open (JP-A) No. 10-274494 describes a composition for rubber production containing natural rubber and biodegradable plastics (in Examples, a vulcanizing agent and a vulcanization accelerator are used). JP-A No. 2000-95898 describes a biodegradable material composition obtained by mixing a biodegradable material, epoxylated polyisoprene, and if necessary a crosslinking agent. JP-A No. 2000-319446 describes a biodegradable rubber composition obtained by adding a biodegradable resin and a filler to natural rubber. Further, JP-A No. 2003-183488 describes a polylactic acid type resin composition containing crystalline polylactic acid, and a rubber component selected from natural rubber and polyisoprene, and JP-A No. 2004-143315 describes a polymer blended material containing a continuous phase of polylactic acid and a dispersion phase of natural rubber or the like, evenly and finely dispersed in the continuous phase.

On the other hand, erasers can be broadly classified into three types: a vinyl chloride type eraser made of a vinyl chloride resin; a non-vinyl chloride type eraser made of a styrene type thermoplastic elastomer or an olefin type thermoplastic elastomer; and a natural rubber eraser.

Among them, more than 90% of erasers in an eraser market are a vinyl chloride type eraser and a non-vinyl chloride type eraser. The polymer material, a plasticizer, and a softening agent composing the erasers are all materials derived from fossil resources such as petroleum oil and continuous use of these erasers is contradictory to the theme of the recycling society establishment.

On the other hand, for instance, as described in JP-A No. 2000-43492 and Gomu Kogyo Binran (Rubber Industry Handbook) (new edition, edited by The Society of Rubber Industry, Japan, published by The Society of Rubber Industry, Japan, Nov. 15, 1973, p. 817, Table 25.2), natural rubber erasers utilize biomass such as subs (factices) produced from natural rubber and plant oils and is in accord with the theme of the recycling society establishment.

However, in the above-mentioned conventional techniques, those obtained without vulcanizing or crosslinking rubber are insufficient in tensile strength or elasticity and therefore applications thereof are sometimes limited and, for instance, they are inadequate as materials for erasers since they do not exhibit rubber elasticity. On the other hand, those which are vulcanized or crosslinked are also sometimes limited in applications because of excess tensile strength and elasticity and for instance, they become too hard as materials for erasers to give rubber elasticity and therefore inadequate. Further, since a vulcanizing or crosslinking step is necessary, the production process not only becomes complicated but also contains critical issue of safety of sulfur as a vulcanization agent and vulcanization chemical agents such as a vulcanization accelerator and an aid such as zinc oxide.

On the other hand, as described above, although the natural rubber erasers are suitable for satisfying the need for recycling society establishment, the natural rubber erasers are inferior in the erasing capability as compared with the vinyl chloride type erasers and since their production process includes a vulcanization step, the production process is complicated as compared with that for the vinyl chloride type erasers or non-vinyl chloride type erasers. Further, as described above, there is an issue of safety of sulfur and vulcanization chemical agents such as a vulcanization accelerator. Moreover, reuse of wastes generated in the production process is difficult, so that it could result in uneconomical consequence and a problem in terms of productivity.

SUMMARY OF THE INVENTION

In view of the above state of the art, it is an object of the present invention to solve the above-mentioned problems of the conventional techniques and to provide an elastomer composition provided with physical properties such as tensile strength and elasticity, which have never been obtained by conventional vulcanization or crosslinking, containing a matrix of poly (3-hydroxybutyrate-co-3-hydroxyhexanoate) (hereinafter referred to as PHBH) and crosslinked natural rubber particles dispersed like islands in the matrix; a method for producing the elastomer composition including kneading the PHBH, natural rubber, and a rubber crosslinking agent at a temperature not lower than the melting temperature of the PHBH and not lower than the crosslinking temperature of the rubber crosslinking agent and dispersing the crosslinked natural rubber particles like islands in the matrix of the PHBH; and an eraser using the elastomer composition.

DETAILED DESCRIPTION OF THE INVENTION

The present invention has accomplished the above-mentioned object and a first aspect of the present invention is an elastomer composition containing a matrix of PHBH and crosslinked natural rubber particles dispersed like islands in the matrix.

A second aspect of the present invention is the elastomer composition of the first aspect, in which a composition ratio of a repeating unit of the PHBH, poly (3-hydroxybutyrate)/poly (3-hydroxyhexanoate) is not less than 80/20 and not more than 99/1 (mol/mol).

A third aspect of the present invention is a method for producing an elastomer composition comprising the steps of; kneading PHBH, natural rubber, and a rubber crosslinking agent at a temperature not lower than the melting temperature of the PHBH and not lower than the crosslinking temperature of the rubber crosslinking agent and dispersing crosslinked natural rubber particles like islands in the matrix of the PHBH.

A fourth aspect of the present invention is the elastomer composition production method of the third aspect, in which a composition ratio of a repeating unit of the PHBH, poly (3-hydroxybutyrate)/poly (3-hydroxyhexanoate) is not less than 80/20 and not more than 99/1 (mol/mol).

A fifth aspect of the present invention is an eraser of an elastomer composition containing a matrix of PHBH and crosslinked natural rubber particles dispersed like islands in the matrix.

A sixth aspect of the present invention is the eraser of the fifth aspect, in which a composition ratio of a repeating unit of the PHBH, poly (3-hydroxybutyrate)/poly (3-hydroxyhexanoate) is not less than 80/20 and not more than 99/1 (mol/mol).

A seventh aspect of the present invention is the eraser of the fifth or sixth aspect, in which the elastomer composition is an eraser composition containing 50 to 99% by weight of natural rubber, 50 to 1% by weight of the PHBH, and 0.1 to 5 parts by weight of a rubber crosslinking agent to 100 parts by weight of the natural rubber.

An eighth aspect of the present invention is the eraser of any one of the fifth to seventh aspects, which further contains a softening agent.

A ninth aspect of the present invention is the eraser of the eighth aspect, in which the softening agent is derived from biomass.

A tenth aspect of the present invention is the eraser of the eighth or ninth aspect, in which the softening agent is selected from animal and plant oils and a plasticizer derived from these oils.

A eleventh aspect of the present invention is the eraser of any one of the eighth to tenth aspects, in which an amount of the softening agent is 1 to 200 parts by weight to 100 parts by weight of the total of the natural rubber and the PHBH.

A twelfth aspect of the present invention is the eraser of any one of the fifth to eleventh aspects, which further contains a filler.

A thirteenth aspect of the present invention is the eraser of the twelfth aspect, in which the filler is derived from biomass.

A fourteenth aspect of the present invention is the eraser of the twelfth or thirteenth aspect, in which the filler is selected from a shell powder and an eggshell powder.

A fifteenth aspect of the present invention is the eraser of any one of the twelfth to fourteenth aspects, in which the amount of the filler is 10 to 1000 parts by weight to 100 parts by weight of the total of the natural rubber and the PHBH.

With respect to the elastomer compositions of the present invention, the materials to be used as raw materials not relying on the fossil resources are all natural rubber and PHBH which is a biodegradable polyester type plastic derived from biomass and accordingly, even if they are disposed, carbon dioxide in the atmospheric air is not increased and thus they are environmentally adequate elastomer compositions which are decomposed in natural environments.

Further, since the elastomer compositions of the present invention are thermoplastic elastomers, the refuse generated at the time of molding can be easily recycled and accordingly, it leads to cost down and is thus adequate to the resource recycling society.

Further, in the elastomer composition production methods of the present invention, since kneading of natural rubber and the PHBH and crosslinking of the natural rubber are simultaneously carried out, the process can be simplified and the productivity is high. Further, vulcanization agents and vulcanization accelerators such as sulfur and zinc oxide are not used for crosslinking the natural rubber, the safety is also high.

The elastomer compositions of the present invention differ from materials obtained by the conventional vulcanization or crosslinking and are therefore suitable, for instance, for base materials of erasers.

The erasers of the elastomer compositions of the present invention are friendly to the environment, being different from the conventional vinyl chloride erasers and non-vinyl chloride erasers which rely on fossil resources and the refuse generated at the time of molding is easily recycled and vain loss of materials is suppressed to result in cost down.

Further, with respect to the conventional natural rubber erasers, a crosslinking step is required in addition to a kneading step whereas kneading and crosslinking are carried out simultaneously in the present invention and the steps are simplified to increase the productivity.

Further, with respect to the conventional natural rubber erasers, vulcanization agents and vulcanization accelerators such as sulfur and zinc oxide are used whereas such chemical agents are not used for the erasers of the present invention and therefore the safety is high.

Moreover, the erasers of the present invention are provided with high erasing capability as compared with the conventional natural rubber erasers and non-vinyl chloride erasers.

Furthermore, the erasers made of the elastomer compositions containing the PHBH of the present invention are provided with higher erasing capability as compared with the erasers made of the elastomer compositions containing, for example, polylactic acid as a biodegradable plastic. This is presumably attributable to a melting point of 100 to 160° C. of the PHBH which is lower than that of 170 to 180° C. of the polylactic acid.

With respect to the erasing mechanism by an eraser, an eraser is closely contacted with letters written on a paper and rubbed against the letters. As a result, the letters are not only adsorbed on the eraser, but the surface of the eraser adsorbing letters is separated off from the eraser as erased scraps to renew the surface so as to be able to adsorb the letters again. Accordingly, it is considered that the erasing capability is greatly affected by proper abrasive performance caused by light stress such as human hands' force. The elastomer compositions of the present invention comprise a discontinuous phase of rubber particles and a continuous phase of the PHBH and thus the abrasive performance is considered to be greatly influenced by physical properties of the continuous phase. In order to effect abrasion by light stress, the strength of the continuous phase should preferably be small. It is surmised that since the PHBH is lower in melting point than the polylactic acid, its strength is liable to decrease by the friction heat at the time of using an eraser, so that more suitable abrasive performance as an eraser can be provided.

The elastomer compositions of the present invention are characterized in that the compositions have a sea-island structure in which a matrix (sea) of the PHBH, crosslinked natural rubber particles are dispersed like islands in the matrix of the PHBH.

The natural rubber to be used in the present invention can be classified into sheet rubber, pale crepe, brown crepe, blanket crepe, block rubber, and crumb rubber, according to a method for processing the rubber from latex into solid type rubber, and various ranking grades are made available, and any natural rubber may be used regardless of production areas. Further, natural rubber derivatives, for example, epoxylated natural rubber, may also be used. They may be used alone or if necessary, two or more types may be used in combination.

The PHBH used in the present invention is, as described in JP-A No. 2007-77232, produced from microorganisms and the composition ratio of the repeating unit is preferably in that poly (3-hydroxybutyrate)/poly (3-hydroxyhexanoate) is not less than 80/20 and not more than 99/1 (mol/mol) from a viewpoint of the balance of flexibility and strength. By changing the composition ratio of the repeating unit, it is possible to change a melting point and a degree of crystallinity and further to change physical properties such as Young's modulus and heat resistance so that the physical properties ranging from polypropylene to polyethylene can be imparted.

The composition ratio of the natural rubber and the PHBH may be properly determined in accordance with applications and physical properties of the intended elastomer compositions, however, for base materials of erasers, the natural rubber is preferably in a range of 50 to 99% by weight and the PHBH in a range of 50 to 1% by weight; the natural rubber is more preferably in a range of 70 to 95% by weight and the PHBH in a range of 30 to 5% by weight. If the PHBH is less than 1% by weight, the fluidity of the elastomer compositions is worsened to cause a problem of moldability. If the PHBH exceeds 50% by weight, the elastomer compositions become too hard to exhibit rubber elasticity, and for instance, in the case of using them as base materials for erasers, it tends to become difficult to obtain a sufficient erasing capability.

The rubber crosslinking agents to be used preferably in the present invention may be organic peroxides. Practical examples are dicumyl peroxide (e.g. PERCUMYL® D, manufactured by NOF Corporation), 2,5-dimethyl-2,5-di-tert-butyl peroxyhexane (e.g. PERHEXA 25B, manufactured by NOF Corporation), di-tert-butylperoxydiisopropylbenzene (e.g. PERBUTYL P, manufactured by NOF Corporation), and 2,5-dimethyl-2,5-di-tert-butylperoxyhexyne-3 (e.g. PERHEXYNE® 25 B, manufactured by NOF Corporation). Additionally, other organic vulcanization agents may also be used. Practical examples are N,N'-m-phenylene dimaleimide (e.g. VULNOC PM, manufactured by Ouchi Shinko Chemical Industrial Co., Ltd.), p-quinonedioxime (e.g. VULNOC GM, manufactured by Ouchi Shinko Chemical Industrial Co., Ltd.), and alkylphenol-formaldehyde resin (e.g. TACKROL® 201, manufactured by Taoka Chemical Co., Ltd.). They may be used alone or if necessary, two or more kinds of them may be used in combination.

The rubber crosslinking agents may be used in an amount of 0.1 to 5.0 parts by weight to 100 parts by weight of natural rubber. If the amount of the rubber crosslinking agents is less than 0.1 part by weight, the crosslinking becomes insufficient and the natural rubber does not become particles, and therefore, it becomes impossible to obtain an intended structure and on the other hand, if the amount exceeds 5.0 parts by weight, the impact resilience of the crosslinked rubber particles tends to become so high to cause a problem of moldability.

The elastomer compositions of the present invention may contain various kinds of additives to be used in fields of biodegradable plastic materials and natural rubber materials. Examples of such additives are ultraviolet absorbents, hindered amine type photo-stabilizers, weathering resistance improvers such as antioxidants, and lubricants of such as higher fatty acid alcohols, aliphatic amides, metal soaps, and fatty acid esters.

In the case where the elastomer compositions of the present invention are used as base materials for erasers, other additives such as a softening agent, a filler, an organic or inorganic pigment, a coloring material such as dyes, a fragrance, a stabilizer, an antioxidant, a UV absorbent, and an anti-mold agent may be arbitrarily added to give elastomer eraser compositions.

Examples of the softening agent may be mineral oils, animal and plant oils, and plasticizers derived from them.

Practical examples of the mineral oils are paraffin type process oil, naphthene type process oil, and aromatic type process oil. Practical examples of the animal and plant oils are rapeseed oil, castor oil, cotton seed oil, linseed oil, soy oil, sesame oil, corn oil, safflower oil, palm oil, coconut oil, peanut oil, Japan tallow, rosin, pine tar, and tall oil. Plasticizers derived from animal and plant oils may include glycerin fatty acid esters and practical examples may be glycerin diacetomonolaurate, glycerin triacetate, and glycerol diacetate. They may be used alone or if necessary two or more of them may be used in combination. In terms of availability of elastomer compositions with further improved environmental friendliness, animal and plant oils derived from biomass, which are regenerable resources, or plasticizers derived from them are more preferable to be used.

The addition amount of the softening agent is 1 to 200 parts by weight to 100 parts by weight of a mixture of the natural rubber and the PHBH. It is preferably 10 to 150 parts by weight. If the softening agent is less than 1 part by weight, the addition amount of the softening agent is insufficient and on the other hand, if it exceeds 200 parts by weight, it may possibly result in occurrence of bleeding.

Examples of the fillers may be heavy calcium carbonate, light calcium carbonate, silica, diatomaceous earth, magnesium oxide, titanium oxide, talc, sericite, quartz powder, montmorillonite, shell powder of scallop, oyster, and freshwater clam, eggshell powder, organic hollow particles, and inorganic hollow particles. They may be used alone or if necessary, two or more of them may be used in combination. In terms of availability of elastomer compositions with further improved environmental friendliness, shell powders of scallop and oyster and eggshell powder derived from biomass, which are generated in a large quantity as wastes, are more preferable to be used.

The addition amount of the filler is 10 to 1000 parts by weight to 100 parts by weight of a mixture of the natural rubber and the PHBH. It is preferably 50 to 500 parts by weight. If the filler is less than 10 parts by weight, the addition amount of the filler is insufficient and on the other hand, if it exceeds 1000 parts by weight, the composition may possibly become hard and no sufficient rubber elasticity can be exhibited, and in the case of using the composition as a base material for an eraser, it tends to become difficult to obtain sufficient erasing capability.

The elastomer compositions of the present invention can be obtained by putting the PHBH, natural rubber, a rubber crosslinking agent, and if necessary, a softening agent, and a filler in a kneader and kneading them at a temperature not lower than the melting temperature of the PHBH and not lower than the crosslinking temperature of the rubber crosslinking agent.

The kneading is preferable to be carried out under high shearing condition. Examples of such a kneader as enabling kneading under high shearing condition may be a biaxial kneading extruder, a Bambury mixer, a pressurizing kneader, and a mixing roll and among them is preferably the biaxial kneading extruder.

The word "a temperature not lower than the melting temperature of the PHBH" preferably means a temperature higher than the melting temperature of the PHBH by 10 to 50° C. and the word "a temperature not lower than the crosslinking temperature of the rubber crosslinking agent" preferably means a temperature higher than the crosslinking temperature of the rubber crosslinking agent by 5 to 20° C.

The elastomer compositions of the present invention have excellent elasticity and cushioning property and are thus useful for cushioning materials for wrapping, heat insulators, sound insulators, sound absorbing materials, tatami mat beds, floor materials and wall materials and particularly useful for base materials for erasers.

A reason for that the elastomer compositions of the present invention has such unique physical properties as compared with conventionally vulcanized or crosslinked compositions is supposedly attributed to that the rubber component is cut in the course of kneading.

The erasers of the present invention using the above-mentioned elastomer eraser compositions are obtained by molding the elastomer eraser compositions by press molding, injection molding, and extrusion molding or the like, and cutting molded products into prescribed sizes to give erasers of elastomers.

Hereinafter, the present invention will be explained in more detail with reference to Examples and Comparative Examples, however it is not intended that the present invention be limited to them.

Materials employed in the following Examples and Comparative Examples are shown in Table 1.

TABLE 1

| Product name | Material name | Maker |
| --- | --- | --- |
| RSS#1 | natural rubber | Produced in Indonesia |
| PHBH | poly (3-hydroxybutyrate-co-3-hydroxyhexanoate) (melting temp.: 120° C.) | Kaneka Corporation |
| LACEA ® H-100 | polylactic acid (melting temp.: 164° C.) | Mitsui Chemicals, Inc. |
| RIKEMAL PL-004 | glycerin diacetomonolaurate | Riken Vitamin Co., Ltd. |
| SS#80 | heavy calcium carbonate | Nitto Funka Kogyo K.K. |
| Scallop shell powder | scallop shell crushed powder | Nitto Funka Kogyo K.K. |
| UNICA | light calcium carbonate | KOMESHO SEKKAI KOGYO CO., LTD. |
| MULTI Z | composite chinese white | KOMESHO SEKKAI KOGYO CO., LTD. |
| PERHEXA ® C-40 | 40% diluted product of 1,1-di (t-butylperoxy) cyclohexane (crosslinking temp.: 120~150° C.) | NOF Corporation |
| PERCUMYL ® D-40 | 40% diluted product of dicumyl peroxide (crosslinking temp.: 150~180° C.) | NOF Corporation |
| ADEKASTAB LA-32 | benzotriazole type ultraviolet absorbent | ADEKA CORPORATION |
| ADEKASTAB LA-77G | hindered amine type photo-stabilizer | ADEKA CORPORATION |
| White Sub No. 1 | sulfur chloride factice | Tenma Factice Manufacturing Co., Ltd. |
| DIANA PROCESS OIL NP-24 | naphthenic type process oil | Idemitsu Kosan Co., Ltd. |
| Sulfax 200S | sulfur powder | Tsurumi Chemical Industry Co., Ltd. |
| NOCCELER TT | thiuram type vulcanization accelerator | Ouchi Shinko Chemical Industrial Co., Ltd. |
| NOCCELER DM | thiazole type vulcanization accelerator | Ouchi Shinko Chemical Industrial Co., Ltd. |
| N OCCELER BG | guanidine type vulcanization accelerator | Ouchi Shinko Chemical Industrial Co., Ltd. |
| Zinc oxide | zinc oxide | Sakai Chemical Industry Co., Ltd. |

EXAMPLES 1 to 11

The natural rubber, softening agents, fillers and photo-stabilizers among the materials shown in Table 2 were previously kneaded by a pressurizing kneader and the rubber crosslinking agents were added using rolls to obtain kneaded rubber materials. The obtained kneaded rubber materials were cut into pellets with about 5 mm square. Next, using a biaxial extruder KZW-15TW-60 (completely intermeshed type in same directions, screw diameter 15 mm, L/D=60) manufactured by Technovel Corporation, the kneaded rubber pellets and biodegradable plastic pellets were supplied at the mixing ratio as shown in Table 2 by respective quantitative supplying units and kneaded at a screw rotation speed of 400 rpm and at a cylinder temperature in a range of 110 to 155° C.

The obtained composition pellets were extrusion-molded into a square rod-like shape by a uniaxial extruder (cylinder temperature 100 to 120° C., and head temperature 130° C.) and cut into elastomer erasers to obtain erasers having a size of 12×18×43 mm.

As the properties of the erasers were evaluated hardness and erasing capability (erasing ratio). The results are shown in Table 2.

The hardness was measured using C type hardness meter (Type C hardness meter, manufactured by Kobunshi Keiki Co., Ltd.) according to JIS S 6050 Plastic Erasers.

The erasing ratio was measured by the following method.

(1) A test specimen was obtained by cutting each sample into a 5 mm-thick plate-like piece and finishing the part to be brought into contact with testing paper to be an arc shape with a radius of 6 mm.

(2) The test specimen was brought into contact with colored paper perpendicularly and at right angles to colored lines and while a weight to be 0.5 kg in total of the weight and the weight of a holder was put on the test specimen, the test specimen was reciprocated 4 times on the colored part at 150±10 cm/min for erasing the colored part.

(3) The densities of the colored part and the erased part were measured by a densitometer (DENSITOMETER PDA 65, manufactured by Sakura Co.) on the basis of the density, which was set 0, of non-colored parts of the colored paper.

(4) The erasing ratio was calculated according to the following equation.

Erasing ratio (%)=(1−(density of erased part÷density of colored part))×100

TABLE 2

| Composition | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Natural rubber | RSS#1 | 100 | 100 | 100 | 100 | 100 | 100 | 100 | 100 | 100 | 100 | 100 |
| Biodegradable plastic | PHBH | 45 | 45 | 45 | 35 | 45 | 45 | 45 | 45 | 45 | 45 | 45 |
| Softening agent | RIKEMAL PL-004 | 70 | 70 | 70 | 70 | 70 | 70 | 70 | 80 | 70 | 70 | 70 |
| Filler | SS#80 | 200 | 200 | 200 | | | 200 | 200 | 200 | 200 | 150 | 100 |
| | SS#30 | | | | | | | | | | 50 | 100 |
| | Scallop shell powder | | | | 200 | 200 | | | | | | |
| | UNICA | | | | | | 10 | | | 10 | 10 | 10 |
| | MULTI Z | | | | | | | 10 | | | | |
| Rubber crosslinking agent | PERHEXA C-40 | 1.0 | 1.5 | 2.0 | 2.0 | 2.0 | 2.0 | 2.0 | 1.5 | 2.0 | 2.0 | 2.0 |
| photo-stabilizer | ADEKASTAB LA-32 | | | | | | | | | 1.0 | 1.0 | 1.0 |
| | ADEKASTAB LA-77G | | | | | | | | | 1.0 | | |
| Natural rubber: biodegradable plastic ratio | | 69:31 | 69:31 | 69:31 | 74:26 | 69:31 | 69:31 | 69:31 | 69:31 | 69:31 | 69:31 | 69:31 |
| Properties | Hardness (Ctype) | 79 | 82 | 84 | 78 | 85 | 84 | 85 | 81 | 84 | 84 | 83 |
| | Erasing ratio (%) | 94 | 94 | 94 | 93 | 94 | 95 | 95 | 94 | 95 | 95 | 95 |

Comparative Example 1

An eraser was obtained in the same manner as in Example 7, except that the PHBH was replaced with polylactic acid (LACEA® H-100, trade name of Mitsui Chemicals, Inc.) and the properties were evaluated. However, in order to correspond to the melting temperature (160 to 170° C.) of polylactic acid, the rubber crosslinking agent was changed to PERCUMYL® D-40 and the cylinder temperature was set at a range of 125 to 190° C. The results are shown in Table 3.

TABLE 3

| Composition | | Comp. Ex. 1 |
|---|---|---|
| Natural rubber | RSS#1 | 100 |
| Biomass plastic | LACEA ® H-100 | 45 |
| Softening agent | PIKEMAL L-004 | 70 |
| Filler | SS#80 | 200 |
| | SS#30 | |
| | Scallop shell powder | |
| | UNICA | |
| | MULTI Z | 10 |
| Rubber crosslinking agent | PERCUMYL ® D-40 | 2.0 |
| photo-stabilizer | ADEKASTAB LA-32 | |
| | ADEKASTAB LA-77G | |
| Natural rubber: biomass plastic ratio | | 69:31 |
| Properties | Hardness (Ctype) | 91 |
| | Erasing ratio (%) | 88 |

Comparative Example 2

Using the materials shown in Table 4, all of the addition materials were kneaded with natural rubber using two rolls to obtain a kneaded rubber material. The obtained kneaded rubber material was previously molded corresponding to the prescribed size of a metal mold and vulcanized and molded using a heat press at 130° C. for 20 minutes. The obtained molded rubber product was cut into prescribed size to obtain a natural rubber eraser and the properties of the obtained eraser were evaluated. The results are shown in Table 4.

TABLE 4

| Composition | | Comp. Ex. 2 |
|---|---|---|
| Natural rubber | RSS#1 | 100 |
| Substitute | White sub No. 1 | 300 |
| Filler | SS#80 | 400 |
| Softening agent | DIANA PROCESS OIL NP-24 | 150 |
| Vulcanization agent | Sulfax 200S | 4 |
| Vulcanization accelerator | NOCCELER TT | 1 |
| | NOCCELER DM | 0.5 |
| | NOCCELER BG | 0.5 |
| Vulcanization aid | zinc oxide | 5 |
| Properties | Hardness (C type) | 60 |
| | Erasing ratio (%) | 90 |

As described above, since the elastomer composition of the present invention comprises a biodegradable PHBH and natural rubber as main components, it is an elastomer composition which does not depend on fossil resources and is recycled without increasing carbon dioxide in the atmospheric air even if being discarded and thus it is friendly to the environment and responds to recycling societies. Further, in the case where the elastomer composition of the present invention is used as a base material for an eraser, it is possible to provide an eraser not only excellent in erasing capability and safety, but friendly to environments since it can be decomposed in natural environments.

The invention claimed is:

1. An eraser made of an elastomer composition containing a matrix of poly(3-hydroxybutyrate-co-3-hydroxyhexanoate) (PHBH) and crosslinked natural rubber particles dispersed like islands in the matrix,
   wherein the elastomer composition is an eraser composition containing 50 to 99% by weight of natural rubber, 50 to 1% by weight of the PHBH, and 0.1 to 5 parts by weight of a rubber crosslinking agent to 100 parts by weight of the natural rubber.

2. The eraser of claim 1, wherein a composition ratio of a repeating unit of the PHBH, poly(3-hydroxybutyrate)/poly(3-hydroxyhexanoate) is not less than 80/20 and not more than 99/1 (mol/mol).

3. The eraser of claim 1, wherein a softening agent is further contained.

4. The eraser of claim 3, wherein the softening agent is derived from biomass.

5. The eraser of claim 3, wherein the softening agent is selected from animal and plant oils and a plasticizer derived from these oils.

6. The eraser of claim 3, wherein an amount of the softening agent is 1 to 200 parts by weight to 100 parts by weight of the total of the natural rubber and the PHBH.

7. The eraser of claim 1, wherein a filler is further contained.

8. The eraser of claim 7, wherein the filler is derived from biomass.

9. The eraser of claim 7, wherein the filler is selected from a shell powder and an eggshell powder.

10. The eraser of claim 7, wherein an amount of the filler is 10 to 1000 parts by weight to 100 parts by weight of the total of the natural rubber and the PHBH.

* * * * *